United States Patent [19]

Collier et al.

[11] Patent Number: 5,061,314

[45] Date of Patent: Oct. 29, 1991

[54] PRODUCTS FOR TREATING SURFACES

[75] Inventors: John R. Collier, Hednesford; Kenneth U. Holker, Kidderminster, both of England

[73] Assignee: Albright & Wilson Limited, Warley, England

[21] Appl. No.: 419,156

[22] Filed: Oct. 10, 1989

Related U.S. Application Data

[62] Division of Ser. No. 135,437, Dec. 21, 1987.

[30] Foreign Application Priority Data

| Dec. 23, 1986 | [GB] | United Kingdom | 8630740 |
| Feb. 17, 1987 | [GB] | United Kingdom | 8703583 |
| Jul. 21, 1987 | [GB] | United Kingdom | 8717231 |

[51] Int. Cl.$^5$ .................. C09K 15/02; B05D 1/36
[52] U.S. Cl. ................ 106/14.05; 106/14.21; 106/14.25; 106/14.39; 106/14.44; 106/453; 148/253
[58] Field of Search .......... 106/14.05, 14.21, 14.25, 106/14.39, 14.44, 453; 148/253; 427/407.1, 409, 410, 417

[56] References Cited

U.S. PATENT DOCUMENTS

| 2,811,473 | 10/1957 | Allen et al. | 148/245 |
| 3,506,499 | 4/1970 | Okada et al. | 148/6.2 |
| 3,650,783 | 3/1972 | Yates | 501/128 |
| 3,705,826 | 12/1972 | Hirst et al. | 148/6.16 |
| 4,264,378 | 4/1981 | Oppen et al. | 148/6.15 Z |
| 4,758,281 | 7/1988 | Eckler et al. | 106/14.12 |

FOREIGN PATENT DOCUMENTS

| 0238760 | 9/1987 | European Pat. Off. |
| 55-44522 | 3/1980 | Japan. |
| 943169 | 12/1963 | United Kingdom. |
| 944419 | 12/1963 | United Kingdom. |
| 1198546 | 7/1970 | United Kingdom. |
| 1234181 | 6/1971 | United Kingdom. |
| 1248127 | 9/1971 | United Kingdom. |
| 1321257 | 6/1973 | United Kingdom. |
| 1355739 | 6/1974 | United Kingdom. |
| 1392019 | 4/1975 | United Kingdom. |
| 1411094 | 10/1975 | United Kingdom. |
| 1454225 | 11/1976 | United Kingdom. |
| 1478546 | 7/1977 | United Kingdom. |
| 1503934 | 3/1978 | United Kingdom. |
| 1516350 | 7/1978 | United Kingdom. |
| 2003191 | 3/1979 | United Kingdom. |
| 1552345 | 9/1979 | United Kingdom. |
| 1563979 | 4/1980 | United Kingdom. |
| 2041987 | 9/1980 | United Kingdom. |
| 1583103 | 1/1981 | United Kingdom. |
| 1587147 | 4/1981 | United Kingdom. |
| 2071070 | 9/1981 | United Kingdom. |
| 2131052 | 6/1984 | United Kingdom. |
| 2145118 | 3/1985 | United Kingdom. |
| 2155962 | 10/1985 | United Kingdom. |
| 2164956 | 4/1986 | United Kingdom. |

*Primary Examiner*—William R. Dixon, Jr.
*Assistant Examiner*—Anthony J. Green
*Attorney, Agent, or Firm*—Frishauf, Holtz, Goodman & Woodward

[57] ABSTRACT

Silica products obtained from trivalent metal e.g. Al compounds and silica can be used as corrosion inhibitors or adhesion promoters for organic coatings on surfaces by way of no-rinse or phosphating treatment or as pigments.

22 Claims, No Drawings

PRODUCTS FOR TREATING SURFACES

This is a division of application Ser. No. 07/135,437 filed Dec. 21, 1987 pending.

BACKGROUND OF THE INVENTION

This invention relates to silica products and their use in the treatment of surfaces prior to organic coating.

FIELD OF THE INVENTION

The treatment of surfaces, especially metal surfaces, prior to the application of organic coatings such as paints, lacquers, adhesives, plastics and the like, is known to be of value not only in increasing the properties of the treated surfaces, in terms of its corrosion resistance, but also as improving the adhesion of the organic coatings enabling them to be more effective. U.S. Pat. No. 3,506,499 describes a process in which an aqueous solution of chromic acid and colloidal silica is applied to the surface formed from zinc or aluminium. British Patent 1,234,181 describes a process in which an aqueous solution comprising hexavalent chromium, trivalent chromium and silica is dried on a metal surface. The application of solutions comprising hexavalent chromium which is toxic is consequently undesirable.

SUMMARY OF THE INVENTION

We have now discovered that mixtures of certain trivalent metals with silica are beneficial as corrosion inhibitors or adhesion promoters for surfaces to be finished with organic coatings.

There is provided an aqueous dispersion comprising an acidic trivalent metal compound, in which the trivalent metal is aluminium, chromium or iron, and silica of fine particle size with a silicon to trivalent metal atom ratio of 0.2–30:1 e.g. 1.5–30:1, or a reaction product of said compound and silica. Preferably the dispersion also contains nickel and/or fluoride ions. There is also provided a two pack composition which comprises in the first pack an aqueous dispersion of the silica, and in a second pack an aqueous solution comprising at least one ingredient which is the acidic trivalent metal compound, nickel or fluoride ion, and when the composition contains 2 or more of the ingredients then at least one but not all the said ingredients can be in the first pack, mixing at least part and preferably all of the contents of the first and second packs producing the above aqueous dispersion of trivalent metal compound and silica.

The present invention provides a process for coating a surface which comprises applying thereto said dispersion of trivalent metal and silica and drying the dispersion on the surface to leave a coated surface; this is a no-rinse process. The dried surface is preferably subsequently coated with an organic coating which is itself then dried e.g. cured by stoving at elevated temperature.

For this no-rinse process and the dispersions for use therein, significant amounts of, and especially any amount of metals in valencies of at least 5 or metals capable of valencies of at least 5 are preferably absent. The process and dispersions are preferably substantially free of oxymetal anions in which the metal has a valency of at least 5 and are especially substantially free of said metals. Thus the metals having 5 or 6 valency, such as molybdenum, niobium, tantalum, vanadium and tungsten e.g. in the form of their oxyanions, and chromium in the form of hexavalent chromium are also usually absent. Most preferred is ferric iron or in particular aluminium, both usually in the absence of chromium. Significant amounts of, and especially any amount of divalent metals e.g. manganese and/or alkaline earth metals such as magnesium, are also preferably absent in the dispersion of this invention which are usually substantially free of alkaline earth metals. The dispersions are usually non oxidizing.

The present invention also provides a process for the treatment of surfaces e.g. metallic surfaces which comprises forming an adherent layer thereon comprising at least one trivalent metal species, in which the trivalent metal is aluminium, ferric iron or chromium or a mixture thereof, and silica of fine particle size, the atom ratio of silicon to trivalent metal being 0.2–30:1 or a reaction product thereof, and then subsequently rinsing the surface. Preferably the trivalent metal and silica are in an acidic solution used to provide a conversion coating on said metal surface, particularly in an acidic solution used in a phosphating process with a divalent metal compound of zinc manganese or ferrous iron and phosphoric acid. Alternatively the trivalent metal cation and silica may be present as such or preferably in the form of a reaction product thereof as components of a paint film applied to the surface. Accordingly there is also provided a coating composition useful as a paint for surfaces e.g. metallic ones which comprises a paint vehicle and a preformed material formed from a trivalent metal compound, in which the metal is aluminium, ferric iron or chromium or a mixture thereof, and silica of fine particle size, or a precursor thereof, or a silicate, the silicon to trivalent metal atom ratio being 0.2–30:1, e.g. 0.5–30:1, said preformed material being preferably otherwise free of significant amounts of, and especially substantially free of metals capable of having a valency of at least 5, such as those described above.

DETAILED DESCRIPTION OF THE INVENTION

The trivalent metal ion is associated with an anion which does not detract from the proposed use of the metal silica product. Preferably the anion is such that the metal salt is water soluble e.g. sufficiently water soluble for the proposed use. Thus in no-rinse coating dispersions and conversion dispersions, higher water solubility is generally required than is needed for the production of the paint component. Examples of suitable anions are mono and diacid phosphate, acid fluoride and acid silicofluoride. Anions such as chloride, sulphate or alkane carboxylate are preferably not used for the no-rinse coating and conversion but are acceptable for paint use. The effect of the anion may vary with the nature of the surface being treated and thus some anions may be acceptable for use on some particular surfaces but not others. The trivalent metal compound is preferably mixed with the silica (or a precursor thereof) under acid conditions. The anion of the acid is usually subject to the same criteria of solubility and non-interference in the use of the metal silica product as is the anion with the trivalent metal cation. Preferably the metal compound is an acid salt e.g. dihydrogen phosphate, with any pH adjustment needed being by addition of phosphoric acid or hydrogen fluoride. Most preferred are ferric trisdihydrogen phosphate and aluminium tris(dihydrogenphosphate) and mixtures with phosphoric acid or the corresponding metal mono hydrogen phosphate.

The silica utilised in this invention should be finely divided with a fine particle size in order to ensure that it can be coated evenly over the surface to be treated. Silica, which has been obtained pyrogenically from silicon tetrachloride, or silica, which has been precipitated in an aqueous medium from alkali silicates, may be used. The forms of silica which are useful in the processes of this invention may also be dictated by the nature of the process. However crystalline forms of silica are not useful in the processes of the invention whereas the amorphous forms of silica may be useful. Thus the silica is usually hydrophilic non-crystalline and colloidal. It usually has Si-OH groups on the surface and preferably only such groups, though some of these may be replaced by Si-O-Na or Si-O-Al groups. The average surface area of the silica is usually 10–1000 $m^2/g$ such as 30–1000 $m^2/g$, e.g. 100–500 and especially 150–350 $m^2/g$. The silica particles usually have an average particle size less than 170 nm or but may be of 1–200 nm e.g. 1–50 nm such as 4–30 mm or especially 8–20 nm. Thus silica gel and precipitated silica may be used, but colloidal silica and fumed silica are preferred especially for no-rinse coating and phosphating processes. In certain processes it may be possible or even preferable to employ a precursor of amorphous silica i.e. a hydrated form of silica in the processes and the compositions of this invention. The most preferred sources of silica for use in this invention are the products which are sold under the Trade Mark AEROSIL in particular those which are fumed silicas with average particle size of 5–20 nm and surface areas of 150–350 $m^2/g$ especially 150–250 $m^2/g$. Less preferred grades of silica for no-rinse coating and phosphating purposes are those liquid dispersion products prepared by ion-exchange processes from a silicate solution, such as those sold under the Trade Marks SYTON and LUDOX which have particle sizes of 5–30 nm and 100–550 $m^2/g$ surface areas and SiOH and SiONa groups on the surface.

The molar ratio of silica to trivalent metal (i.e. silicon to trivalent metal) is 0.2–30:1 preferably 0.5–20:1 e.g. 15.–20:1 such as 1.5–10:1 or 3.5–30:1. For use in no-rinse coating and phosphating processes preferred molar ratios are 2.5–10:1 or 2.5–9.5:1 and especially 3–8:1 or 5–8:1 or alternatively 5.5–30:1, e.g. 5.5–9.5:1, while for use in pigments in paints preferred molar ratios for silicon in silica or silicate to trivalent metal are 1–15:1 e.g.1–10:1 such as 1–5:1 and especially 1.5–3.5:1, though ratios of 10–30:1 can also give benefits.

In the preferred mixtures and products of the invention there is an anion which is preferably an acid phosphate; the atom ratio of trivalent metal to P for no-rinse coating use is usually 0.2–0.45:1 e.g. 0.23–0.4:1 such as 0.3–0.36:1 or 0.33–0.36:1 especially for aluminium compounds and 0.23–0.33:1 e.g. 0.23–0.3:1 especially for ferric compounds. For use in the phosphate conversion process the atom ratio of P to trivalent metal is usually 4–10:1 e.g. 4–8:1 for dispersions used in immersion processes and 10–30:1 e.g. 15–25:1 where the solution is to be sprayed onto the surface to be treated. For use in paints the molar ratio of trivalent metal to phosphoric acid (free or combined) is preferably 1:1–10.

The trivalent metal and silica are reacted together and/or with the underlying substrate surface and/or with phosphoric acid or hydrofluoric acid at some stage prior to the end of the final step in the production of the treated surface. This reaction can occur at a temperature of at least 50° C. e.g. at least 150° C. and this temperature may be reached either during drying of the mixture of ingredients in a no-rinse coating or conversion process on the surface and/or in the drying and curing of an organic coating applied thereto subsequently. Preferably in a no-rinse coating process the dispersion is dried at elevated temperatures e.g. 50°–300° C. and then the organic coating is cured at elevated temperature usually higher than the previous temperature e.g. at least 150° such as 150°–300° C.

The reaction produced by these heating processes may be a metal coated silica, optionally complexed with fluoride and/or phosphate, or a complex metal silicate or silicophosphate.

The aqueous dispersions of the invention are usually made directly from the trivalent metal compound and silica (or precursor thereof). Thus a compound of the metal may be dissolved in water, in the presence of acid e.g. phosphoric or hydrofluoric acid if desired to give a solution of the required concentrations with which there is mixed the silica, preferably itself in the form of an aqueous dispersion or less preferred as finely divided solid. Products which are free from agglomerated silica particles are preferred for use in this invention. Where there is a tendency for the silica particles to form agglomerates we prefer to agitate the dispersion vigorously in order to reduce the size of these agglomerates before mixing with the trivalent metal compound. Particularly for use in paints, the metal salt solution may be mixed directly with a precursor for the silica or alkali metal silicate in aqueous solution with subsequent adjustment of the pH if needed. The aqueous dispersion is usually at pH 1.5–2.5 especially 1.8–2.2. The dispersions when ready for use in no-rinse coating processes preferably comprise of 1–20% e.g. 3–15% by weight of dissolved and dispersed material, but are advantageously made in a more concentrated form with 3–50% e.g. 15–40% of such material, for dilution when ready for use. Thus the dispersions may contain 0.01–0.6 g atoms/l e.g. 0.02–0.45 g atoms/l of the trivalent metal, 0.05–5 g atoms/l e.g. 0.15–3.3 g atoms/l of silica and usually 0.01–3 g atoms/l e.g. 0.06–2.0 g atoms/l of phosphate values.

In the inorganic no-rinse coating process for pretreatment of the surface before organic coating e.g. painting, the concentration of the treatment solution should be sufficient to ensure that the desired weight of coating is deposited per unit area of the surface to be treated. Preferably the dried-on film will have a weight of from 20 to 5000 $mg/m^2$, more preferably from 50 to 1000 $mg/m^2$; coating weights for aluminium are preferably 100–300 $mg/m^2$ and for steel preferably 300–700 $mg/m^2$. The quantity of solution applied to the surface varies with the method of application and the nature of the surface to be and the concentration of the solution will be adjusted so as to provide the desired weight of dried coating on the particular surface.

The surface to be treated may conveniently be formed from any non-porous material such as metal, glass or plastic. The treatment of surfaces formed from common metal forms a preferred aspect of the present invention. The invention finds particular application in the treatment of surfaces formed from iron, aluminium, tin or zinc, or alloys comprising one or more of these metals alloyed with themselves or with other metals such as copper, nickel and/or magnesium. Examples of alloys or alloy surfaces which can be treated include stainless steel and aluminium alloys of international designations 3103 and 5052. Examples of other particular metals include aluminium can stock, mild steel, galvanised mild steel and tin plate. The metal may be in the form of a thin surface layer formed on a substrate. The substrate may be metallic e.g. tin plate or non-metallic e.g. plastics material. The substrate may take the form of individual articles, tubes, rods, wires, plates, panels or strips. However the treatment is preferably carried out by the mechanical application of a treatment solution to the metal surface and the treatment is thereby particularly useful for the treatment of metal strip and metal sheets. The processes may also be used to treat surfaces formed from plastics such as polypropylene, ABS plastics and polyurethanes.

They can also be used to treat surfaces coated with plastics, paints or other organic materials to promote adhesion of a second coating layer such as a paint or lacquer. In a preferred embodiment the processes can be used to treat a surface layer of resin applied electrophoretically e.g. a cataphoretic resin, which layer is subsequently to be painted. In this embodiment the processes find particular utility in the treatment of films of cataphoretically applied acrylic resins, such as those sold under the Trade Mark ELECTROCLEAR 2000, prior to subsequent painting.

The surface must be clean prior to the application of the treatment solutions if good results are to be obtained. Normally the surface will be cleaned if necessary in order to remove oil, dirt and corrosion products and subsequently rinsed with water prior to the application of the solution.

Where the surface is formed of a metal, the drying of the dispersion coating is preferably carried out by heating the metal to a temperature of at least 50° such as 50°–300°C. usually at least 150° C. Drying may be carried out at lower temperatures, such as 50°–150° C. e.g. 50°–100° C., but, particularly when the surface is a metal surface, this heating is especially in the presence in the dispersion of an accelerator such as hydrofluoric acid, nickel salts, nitrates or hydrogen peroxide.

The preferred accelerator for use in the no-rinse coating processes is hydrofluoric acid. The amount of accelerator added is usually such that the molar ratio of silica to accelerator ion is at least 0.5:1 and preferably at least 5:1 such as a range of 0.5:1 to 250:1. The use of excessive quantities of accelerator, especially hydrofluoric acid, in the coating pretreatment processes may impart undesirable properties to the subsequent organic coating and in general the amount of accelerator added will be controlled so as to avoid this. The pH of the dispersions after addition of the hydrofluoric acid is usually 1.3–2.3. Preferably the amount of fluoride ion in the dispersion for coating the metal surface is 0.5–20 g/dm$^3$ especially 2–6 g/dm$^3$, lower amounts necessitating use of high drying temperatures. Thus with 2–6 g/dm$^3$ drying temperatures can be 60°–90° C. e.g. 70° C.

Preferably the dispersion of silica and trivalent metal compound contains a nickelous salt, added e.g. as nickelous sulphate instead of fluoride accelerator, but preferably added as nickelous fluoride e.g. as the tetrahydrate. Especially there is used nickelous fluoride and extra hydrofluoric acid in an atom ratio of Ni to total F of 1:2–4. Both nickel and fluoride ion are preferably present whatever the silicon to trivalent metal atom ratio but especially when it is 0.2–5:1, e.g. 1.5–3.5:1 or 1.5–20:1 such as 2.5–10:1. Amounts of nickelous ion in the dispersion to be applied to the surface are usually 0.1–20 g/l e.g. 0.1–10 such as 0.1–3 g/l and especially 0.1–1 g/l or 0.1–0.6 g/l with a molar ratio of Si:Al:Ni of 90:11:1 to 1:0.5:1. When the nickel is added as nickelous fluoride with extra fluoride the amount of nickelous and fluoride ion in the dispersion ready for application to the surfaces is preferably 0.1–10 g/l or 0.1–3 g/l e.g. 0.1–1.0 such as 0.1–0.6 g/l; the molar ratio of Si:Al:Ni:F is preferably 600:80:1:2 to 30:4:1:4. These benefits are especially applicable in the treatment of steel for which the results can be better than with chromate pretreatment operations and also aluminium panels e.g. for aluminium can stock.

The dispersion of the invention may be made and stored ready for use, or may be kept in the form of a 2 pack composition in which the first pack contains the silica, and the second pack at least some of the other ingredients usually the trivalent metal compound. Any nickel and/or fluoride present can be in either pack, and if there is nickel fluoride in the second pack, the trivalent metal compound can be in either pack. However for increased storage life the first pack preferably contains the silica and not the other ingredients, while the second pack preferably contains all the remaining ingredients. When ready to be used, at least some and preferably all the contents of the two packs are mixed, the amounts of components taken from each pack being such that on mixing the dispersions of the invention are made.

The combination of the trivalent metal and silica can also be used in a conversion coating operation. Conversion coatings involve the treatment of a metal surface with an acidic solution which attacks the surface of the metal to form a strongly adhesive layer formed from metal salts. Such processes are characterised by the subsequent need to rinse excess of treatment solution to remove residual soluble compounds from the surface of the metal in contrast to the no-rinse coating procedures described above in which the aqueous dispersion is dried onto the surface without any subsequent removal of soluble products e.g. by washing. A particular type of conversion coating process in which the present invention finds particular application is the so-called phosphating process. Phosphating is a conversion process which is widely used to treat surfaces formed from a variety of metals in particular iron and steel, zinc, and aluminium and alloys thereof. Previous phosphating processes involve the application of a dilute solution comprising one or more of the phosphates of ferrous iron, manganese or zinc in phosphoric acid to the surface of the metal in such a manner and under conditions as to bring about the formation of a conversion coating of phosphate salts upon the surface of the metal and subsequently rinsing the surface, preferably with water but optionally with chromate containing solutions e.g. aqueous chromic acid.

This embodiment of the processes of the present invention is characterised by the presence of a suitable salt of the trivalent metal and silica in the phosphating bath. The phosphating liquor can thus contain an aqueous dispersion of the invention together with a divalent metal compound of zinc manganese or ferrous iron and phosphoric acid. The phosphating liquor can comprise from 0.01 to 2.0 moles/liter of silica and from 0.01 to 4.0 moles/liter of the trivalent metal, the molar ratio of silica to trivalent metal being 0.2–30:1 e.g. 0.5–20:1 and the molar ratio of trivalent metal ion to divalent metal ion being preferably within the range 30:1 to 1:30 e.g. 3:1 to 1:3 or 2.5:1 to 0.5:1 such as 1.5:1 to 1:1.5.

These phosphating liquors may comprise additives in addition to the phosphate salt of zinc, manganese or ferrous iron or mixture thereof especially mixtures of zinc and manganese. The dispersions may also contain nitrites or fluorides, oxidising agents such as nitrates, chlorates or peroxides, reducing agents such as sulphites and hydroxylamine, organic additives such as quinoline toluidine and nitrophenols and heavy metals such as copper, nickel and chromium.

The phosphating is carried out by immersing the surface to be treated in a bath containing the phosphating liquor or by spraying the liquor on the surface for a period of from 0.1 to 15 minutes e.g. 0.1-5 minutes for spraying or 1-15 minutes more usually from 5 to 10 minutes for immersion whilst maintaining the bath a temperature of from 40° to 110° C. e.g. 50° to 90° C. After the phosphating process is complete, the surface is removed from the bath and rinsed with water and dried e.g. at 50°-300° C., such as 100°-150° C. for 1-10 min.

After the coating process without rinsing or after the conversions process with rinsing, there may be applied to the dried treated surface an organic coating which is usually dried at elevated temperatures as described above. The organic coating is usually a paint, lacquer, powder coating or adhesive. Examples of suitable vehicles for the coating are thermosetting resins and preferred are alkyd resins, polyester paints, epoxy resins e.g. epoxy novolac resins, vinyl dispersions and drying oils and may be water or organic solvent based. The drying step may be simply to remove the water or solvent but is preferably also to cure the organic coating by stoving. Stoving paints are preferred.

Also in the organic coating applied to the surface there may be paint additives such as pigments, fillers and chopped fibres for example calcium carbonate titania or glass fibre.

It has been also found that the combination of certain proportions of silica to trivalent metal especially aluminium, in the pretreatment of alumunium panels gave surprising results not possessed by other combinations of silica to the metal, and when no such change in behaviour was obtained with comparable proportions when applied to steel. Thus with aluminium panels e.g. of alloy 3103 atom ratios of Si:Al in the dispersion of the invention of 3.5-20:1 and especially 5.5-12:1 e.g. 6-9:1 after no rinse treatment drying, and organic coating and curing gave much better results in adhesion tests than with atomic ratios less than 3.5:1. In this case the organic coating was preferably a coil coating enamel e.g. an unsaturated polyester.

In a third aspect of the invention the trivalent metal compound and silica may be intimately admixed and heated to a temperature of at least 100° C. e.g. at least 150° C. in order to form a solid material which is useful as a pigment in anticorrosive paints. The pigment may be made by drying an aqueous dispersion of the silica in a solution of water soluble salt of the trivalent metal, the dispersion being preferably at pH 1.5-6.5, using techniques such as spray drying which involve the use of elevated temperatures. Preferably however the dispersion dried is the product of mixing an aqueous solution of the trivalent metal salt with an alkali metal silicate in the desired molar proportions of trivalent metal to silicon e.g. 1:1-15 and especially 1:1.5-3 and then filtering the solid obtained, washing it thoroughly with water, and refiltering and then drying it at a temperature of at least 100° C. or at least 150° C. Instead of filtering the solid from the product suspension before washing, the whole suspension may be dried before the washing step. Usually in the production of the anti-corrosive material, the solution of trivalent metal salt is added to the silicon component with adjustment of pH if needed.

The paint compositions of this invention may be formulated using any conventional paint vehicle which maybe water or organic based and is preferably heat curable.

Examples of useful vehicles include alkyd resins, epoxy resins and drying oils. Preferably the paints will comprise from 15 to 50 parts by weight of the total pigment with from 1-20% by weight (of the composition) of the anti corrosive pigment of the invention. Materials prepared by the admixture or reaction of a trivalent metal compound and silica at lower temperatures may be useful as anti-corrosive pigments in paint compositions according to this invention where the paint is a stoving paint i.e. it is cured by exposure to a temperature of at least 100° C., e.g. at least 150° C. An example of a material which is useful in this respect is the material obtained by precipitating an insoluble salt of a trivalent metal from a dispersion of silica containing the metal in solution thus coating the silica particles with a layer of the precipitated salt. The precoated or preconverted substrate carrying the dried organic coating or the substrate carrying the paint with the trivalent metal silica material in it is often more resistant to corrosion or loss of adhesion of the organic coating from the substrate than hitherto has had been found.

The organic coated substrate can be in the the form of steel pipes e.g. water, gas or oil pipes or formed into aluminium cans.

The invention is illustrated by the following examples:

EXAMPLE 1

Metal treatment solutions having the composition set forth below were prepared. The trivalent metals and the phosphate were introduced as the metal dihydrogen phosphate. The aluminium dihydrogen phosphate was in the form of a 48% w/w S.G. 1.48 solution of aluminium acid phosphate of Al:P atom ratio of 0.34:1. The silica was pyrogenic silica sold under the Trade Mark AEROSIL 200 with an average surface area of 200 $m^2/g$ and average particle size of 12 nm. It was introduced in fine aqueous dispersion. In Example G aluminium oxide was dissolved in a hydrofluoric acid solution. The solution and dispersions as described above were mixed in the required proportion to form concentrated dispersions which were then diluted to give dilute dispersions which were ready for use as a metal treatment solution as such or after addition of fluoride added as 40% aqueous hydrofluoric acid.

| EXAMPLE | $M^{3+}$ g/l | $PO_4^{3-}$ g/l | $SiO_2$ g/l | $F^-$ g/l |
|---|---|---|---|---|
| A | Al 6.02 | 65 | 100.0 | |
| B | Al 3.01 | 33 | 50.0 | |
| C | Al 1.00 | 11 | 16.0 | |
| D | Al 1.00 | 11 | 16.0 | 8.0 |
| E | Al 6.02 | 65 | 25.0 | |
| F | Al 3.01 | 33 | 12.5 | |
| G | Al 1.00 | — | 16.0 | 8.0 |
| H | Fe 6.20 | 33 | 50.0 | |
| J | Al 1.00 | 11 | 16.0 | 4.0 |
| K | Al 1.00 | 11 | 16.0 | 1.0 |
| L | Al 1.00 | 11 | 16.0 | 0.5 |

The pH of the solution in Ex A-L was 1.4-2.5.

The dispersions of Examples A–L were applied to metal panels which had been cleaned to give a surface free from water breaks. The panels for Example A, B, E, F, H, were of mild steel and for Ex C, D, G, J, K, L, were of aluminium. A Sheen spinner was used to give coating weights varying between 200 mg/m$^2$ and 800mg/m$^2$ after drying at peak metal temperatures between 70° C. and 235° C. The panels coated with the dispersions of Ex A–C, E, F and H were dried at peak metal temperatures of 235° C., while those of Ex. D, G, J, K, L, were dried at 70° C. The dry panels were coated with (i) an epoxy lacquer (ii) a polyester paint or (iii) an organosol using a Sheen spinner or bar coater. The panels were then dried at the appropriate paint stoving temperature in the region of 200°–250° C.

The painted panels were tested for adhesion by a zero T bending test and the Erichsen test, and for corrosion by a salt spray test in accordance with ASTM-B117. Painted mild steel panels were tested for cathodic disbondment using 40 g/l sodium hydroxide solution at 70° C. with an applied voltage of 5 volts for 1 hour. The results were compared to those in which the metal phosphate/silica was replaced by the optimum coating weights of the chromate/silica dispersions of the type described in British Patent 234181. The results with the aluminium panels treated in Ex. C, D, J, K, L, were better than with chromate/silica while those with the rest of the Examples were comparable to use of chromate/silica.

EXAMPLE 2

250 gms of the amorphous fumed silica used in Ex 1 was dispersed in a portion of demineralised water by adding the silica in aliquots whilst vigorously stirring the dispersion. Further demineralized water to bring the volume of water up to 1 liter was slowly added to the vessel. The resulting dispersion was filtered through glass wool to remove the few agglomerated large particles and leave a silica dispersion.

This dispersion was mixed into the solution of aluminium orthophosphate, used in Ex 1, in the ratio of 4:1 by volume to give a concentrated dispersion with a mole ratio of silica to aluminium of 7.46:1. The resulting concentrate was diluted for use in the treatment processes by the addition of five volumes of demineralised water to one volume of concentrate and then addition of 1% by volume of 40% aqueous hydrofluoric acid to give a aluminium silica coating or pretreatment solution.

15 cm × 10 cm panels of aluminium (5052 alloy) were degreased in trichloroethylene vapour, immersed in nitric acid (10%) for 30 seconds, rinsed in water, immersed in a hot, alkaline etch cleaner for 10 seconds, rinsed, mechanically desmutted and rinsed with hot water. The panel was dried by spinning using a Sheen spinner. The cleaned panels were divided into three groups (i) a control group which was not pretreated and (ii) and (iii) which were pretreated by coating by applying a pretreatment solution on the spinner and removing the excess by spinning for 20 seconds. The panels were then dried to a peak metal temperature of 70° C. to leave a total coating weight of 250 mg/m$^2$. For group (ii) the aluminium silica pretreatment solution was used. For group (iii) a chromate silica based pretreatment solution of the type described in British patent 1234181 was used.

One different panel from each group was coated with each of the following organic finishes, each of which was supplied by EIAN Industrial Coatings
  (a) a white unsaturated polyester paint (UP1230D) product
  (b) an epoxy-phenolic lacquer (Konserv A133S) product
  (c) an organosol (ICE 2007 111 C) product
  (d) an epoxy-phenolic lacquer (IP 1602) product The curing temperatures for finishes (a)–(d) were 160°–180° C., 280° C., 270° C. and 200° C. respectively with curing times of 10, 1.5, 1.5 and 12 minutes respectively.

All the panels were then tested for resistance to corrosion by pressing into cans and exposure to hot acid solution. The amount of corrosion was then assessed by eye. In each case the group (i) untreated panels were severely attacked. The group (ii) panels were attacked to a lesser degree than those of group (iii) which was much smaller than the degree of attack found in group (i).

EXAMPLE 3

A concentrated aqueous dispersion was made up by mixing 33 parts by weight of a 30% by weight aqueous colloidal silica dispersion, 20 parts by weight of the aqueous aluminium dihydrogen phosphate solution as used in Ex 1 and 7 parts by weight of demineralized water. The silica dispersion was sold by Monsanto as SYTON D30 and had SiONa and SiOH groups thereon, and an average particle size of 7 nm and surface area of 320 m$^2$/g.

A pretreatment coating dispersion was made by adding 1 part by volume of the concentrate to 5 parts by volume demineralised water. A metal substrate coated with a layer of an acrylic cataphoretic resin, sold under the Trade Mark ELECTROCLEAR 2000, was immersed in the pretreatment solution for 30 seconds. The substrate was removed from the pretreatment solution and allowed to drain and dry at ambient temperature.

A polyester/epoxyphenolic stoving paint (McPhersons No. 162 White, Stove 160° C. for 10 mins) was applied to the surface of the substrate using a Sheen Spinner. The coated metal was stoved at 160° C. for 10 mins. The experiment with the resin coated substrate was repeated but without the pretreatment coating solutions. The substrate which had been pretreated before painting showed excellent paint adhesion in a cross hatch test. In comparison the substrate for which the pretreatment had been omitted, exhibited almost complete loss of paint adhesion in the cross hatch test.

EXAMPLE 4

The process of Example 2 was repeated with the aluminium phosphate silica concentrate being diluted with different volumes of demineralized water in Ex 4a, 4b, 4c, 4d, and 4e namely 1, 3, 5, 7, and 10 volumes respectively per volume of concentrate and 1% by volume of 40% aqueous hydro fluoric acid solution being added to the diluted concentrate to give dry coating weights on the aluminium strip of 1,000, 500, 250, 180 and 100 mg/m$^2$ respectively. In these experiments all the paints of Ex 2 were used. Tests on the painted panels showed the results to be in the decreasing order Ex 4d, 4e, 4c, 4b, 4a. All but Ex 4a were better than corresponding experiments done with a chromate silica dispersion.

EXAMPLE 5

The no rinse process of Ex 4b was repeated (Ex 5a) with thin gauge mild steel (blackplate) with the aluminium phosphate silica concentrate diluted with 3 volumes of water to give a diluted dispersion to which 1% v/v of 40% hydrofluoric acid was added. The experiment was also repeated (Ex 5b) with the Aerosil 200 silica replaced by an equal weight of Aerosil OX50 fumed silica of 40 nm particle size and 50m$^2$/g surface area, and the concentrate diluted with only 2 volumes of water. The dry coating weights were 500 mg/m$^2$ and 750 mg/m$^2$ for Ex 5a and 5b respectively. After drying at 70° C. the panels were coated with the following finishes (i) pigmented vinyl dispersion applied to a wet film weight of 8 g/m$^2$ and cured 10 min at 210° C. in a vinyl dispersion applied and cured as in (i) and (iii) an epoxyphenolic resin (Konserv ICE 200 8A with catalyst) applied to a wet film weight of 6 g/m$^2$ and cured at 280° C. for 90 sec. All the combinations of silicas and finishes gave results better than with the corresponding unpretreated organic finished panels and those of Ex 5a with finish (i) gave results better than or comparable to corresponding panels with a chromate based silica dispersion.

EXAMPLE 6

The processes of Ex 5(a) and 5(b) were repeated (Ex 6(a) 6(b)) with cleaned panels of mild steel suitable for pipeline use and also with 2 other silicas, namely (Ex 6c) Aerosil K315 which is a premade 30% aqueous dispersion of fumed silica supplied by Degussa with the silica having an average particle size 15 nm and surface area 170 m$^2$/g, for which the concentrate was diluted with 7 volumes of water before addition of the hydrofluoric acid, and the layer dried at 160° C., and (Ex 6d) Aerosil MOX 170 (with the same average particle size surface area as K315), for which 3% v/v of the hydrofluoric acid was used. Dry coating weights were for Ex 6a-6d 500, 750, 180 and 180 mg/m$^2$ respectively.

The dried panels were lacquered with a bronze tinted clear stoving lacquer (Macphersons 4244/000) to a dry coating thickness of about 15 micro meters. In cathodic disbondment tests, the pretreated painted panels were much better than untreated painted panel and comparable to those with chromate silica pretreatment.

EXAMPLE 7

The process of Ex 4 (b) was repeated with mild steel panels and with panels of aluminium alloy 3103 and varying proportions of the silica dispersion to aluminium phosphate solutions. In each case the concentrate obtained was diluted with 3 volumes of water for the steel panels and 5 volumes of water for the aluminium panels, before application to the metal to give coating weights of 250 mg/m$^2$ for aluminium and 500 mg/m$^2$ for mild steel respectively. The organic finish was an unsaturated polyester coil coating enamel MacPherson's 3586/105 applied and cured for 10 min at 232° C. The panels were tested in a Zero T bend test. The pretreated coated mild steels scored 7-9 out of 10 in the test (10 being the best result) when the volume proportions of silica dispersions to aluminium phosphate solution varied from 9:1 to 2:8 i.e. molar ratios of silica to Al of 16.6:1 to 0.46:1. The pretreated coated aluminium panels gave the following results

| v/v silica to aluminum | 9:1 | 8:2 | 7:3 | 6:4 | 2:8 |
|---|---|---|---|---|---|
| phosphate molar Si:Al | 16.6:1 | 7.4:1 | 4.3:1 | 2.8:1 | 0.46:1 |
| Score out of 10 | 3 | 7 | 3 | 0 | 0 |

EXAMPLE 8

The process of Example 4b was repeated with a mild steel panel and, instead of addition of 1% of the hydrofluoric acid there was added nickelous fluoride and hydrogen fluoride in an atom ratio Ni:F of 1:2.3 to give a dispersion ready for coating the metal with an atom ratio of Si:Al:Ni:F of 140:19:1:2.3. The dry coating weight on the metal was 500 mg/m$^2$. After drying at 70° C. the panel was coated with the enamel used in Ex 7 and stoved at 232° C. for 10 min. The pretreated painted panel was tested for adhesion in a zero bend test and for corrosion in a 500 hr. neutral salt spray test and proved to be better overall than a corresponding painted panel pretreated with the chromate silica dispersion. The pretreated painted panels were also compared in a cathodic disbondment test performed as in Ex 1; the panel pretreated with Al, Si, Ni and F compounds gave better results than with Cr and Si compounds.

EXAMPLE 9

In this example modifications of the process of Example 8 were used. The aqueous silica dispersion was of 15% w/v concentration and was mixed with the aqueous aluminium acid phosphate solution as in Ex 1 in various proportions. The concentrates obtained were diluted with 3 volumes of water and the nickel fluoride and hydrofluoric acid (atom ratio Ni:F of 1:2.3) as used in Ex 8. The treatment mixture obtained was applied to mild steel and dried, painted and cured as in Ex 8. In zero bend tests the coated panels from no rinse treatment mixtures with volume proportions of silica dispersion to aluminium phosphate solution of 9:1, 8:2, 6:4, 4:6 and 2:8.

Si:Al atom ratios of 10.0:1, 4.5:1, 2.6:1, 0.75:1 and 0.28:1 respectively gave results comparable to those with chromate/silicate dispersions.

EXAMPLE 10

The process of Ex 4b was repeated with a 48% w/w aqueous solution of ferric tris (dihydrogen phosphate) and phosphoric acid with an atom ratio of Fe to P of 1:4 instead of the aluminium phosphate solution. The coating weights were about 500 mg/m$^2$. The volume ratios of the silica dispersion to the ferric phosphate solution were 9:1 to 1:9 giving atom ratios Si:Fe of 18.75:1 to 0.23:1. The experiments were repeated with volume ratios of silica dispersion to ferric phosphate solution of 7:3 to 1:9 giving atom ratios of Si:Fe of 4.9:1 to 0.23:1 and dilutions of the concentrates with 5 volumes of water to give coating weights of about 250mg/m$^2$. The pretreated painted panels gave good results in the zero T bend test comparable to those with chromate silica pretreatment.

EXAMPLE 11

A phosphating solution was made up by dilution to 2% v/v with demineralized water of a concentrate obtained by reacting zinc oxide (189.5 g) with phosphoric acid (SG 1.75, 472.5 ml) and water (472.5 ml), and to this diluted solution was added sodium nitrite in aqueous solution to give a concentration of nitrite of 0.02% w/v. A steel panel was treated with this solution for 5 min at 71°-82° C. rinsed with water and dried. The process was repeated with addition to the diluted solution of 10% v/v of an aqueous dispersion of the Aerosil 200 silica/aluminium acid phosphate concentrate of Ex 2. The resulting phosphating medium contained zinc and aluminium in an atom ratio of 1:1.

The panels were painted with Macphersons white coil coating polyester enamel 3586/191 and cured for 10 min at 232° C. and then subjected to corrosion tests for 500 hr in neutral salt spray. The phosphated painted sample scored 8 out of 10 while that with extra silica and aluminium phosphate scored 1 out of 10, the scale being from 0 (no blistering around diagonal scribe lines) to 10 (total covering in blisters).

EXAMPLE 12

The aluminium hydrogen phosphate solution used in Ex 1 (40 ml) was thoroughly mixed with an aqueous 25% dispersion of Aerosil OX50 silica (as used in Ex 5) (320 ml) and aluminium oxide (28 g) and the product slurry dried at 156° C. for 5 hr. The solid was ground to a powder, washed thoroughly with water, redried and reground.

This solid was compared as an anti corrosive pigment to zinc phosphate, aluminium tripolyphosphate and a calcium silica ion exchange pigment. In each case 20 g of each pigment was mixed with 300 ml of acrylic stoving enamel in a ball mill and the paint obtained applied by a 24 micron bar coater to a cleaned mild steel panel. The coated panel was stoved at 165° C. for 20 min, diagonally scribed and then subjected to a neutral salt spray. The pigment from the aluminium phosphate and silica was better than the others in terms of reduction in paint loss and rust spread from the scribe lines.

EXAMPLE 3

For Ex 13a aluminium hydrogen phosphate solution used in Ex 1 (40 ml) was added with stirring to an aqueous solution of sodium silicate (24 g) in deionized water (200 ml). The slurry mixture obtained was heated at 180°-200° C. for 2 hrs to give a dry solid which was ground to a powder, washed well with water until the filtrate had a pH greater than 5, and finally dried for a further 2 hrs at 180°-200° C.

The process was repeated with 162 g of sodium silicate and an extra 47 ml of phosphoric acid (SG 1.75) (Example 13B), or 80 ml of the aluminium phosphate solution and 24 g sodium silicate in the water (Ex 13C) or 80 ml of the aluminium phosphate solution and 12 g of sodium silicate with water (Ex 13D). The process was repeated with aluminium sulphate 16 hydrate (28 g) and sodium silicate (24 g) in 200 ml of deionized water (Ex13E). Finally the process of Ex 13A was repeated with 63 g of 48% w/w chromic tris (dihydrogen phosphate) solution.

In each case the dried solid was ball milled at 7% w/w into Macpherson Seashell acrylic stoving enamel (3761/125) and the paint obtained applied to a cleaned mild steel panel with a bar coater to a thickness of 35-40 micron. After stoving at 160° C. for 20 mins. the panels were scribed diagonally and subjected to a 500 hr salt spray test. The results were compared to that obtained with zinc phosphate with scoring from 0 (best) to 10 (worst).

| Ex | 13A | 13B | 13C | 13D | 13E | 13F | Zn phosphate |
|---|---|---|---|---|---|---|---|
| Metal Ion | Al | Al | Al | Al | Al | Cr | — |
| Si:M | 2.24:1 | 14.9:1 | 4.6:1 | 2.24:1 | 1.13:1 | 2.24:1 | — |
| Score | 5 | 4 | 5 | 5 | 5 | 5 | 7 |

EXAMPLE 14

The process of Ex 2 was repeated with the replacement of the addition of 1% of the hydrofluoric acid by nickelous fluoride and hydrogen fluoride in an atom ratio of Ni:F of 1:2.3 to give a dispersion ready for coating the metal with an atom ratio of Si:Al:Ni:F of 93:12:1:2.3. The aluminium panels were then coated, dried painted and cured as in Ex 2. The results were even better than those of Ex 2 group (ii).

We claim:

1. An anticorrosive material comprising a reaction product obtained by reaction of a trivalent metal compound, in which the metal is selected from the group consisting of iron, aluminum, chromium and mixtures thereof, and a silicon-containing moiety comprising an aqueous dispersion of silica of a fine particle size or a precursor thereof or an aqueous solution of a silicate, with a silicon to trivalent metal atom ratio of 0.2-30:1, said product being substantially free of water-soluble by-products of said reaction.

2. The material according to claim 1, wherein the silicon to trivalent metal atom ratio is 1-5:1.

3. The material according to claim 1, wherein the silicon to trivalent metal atom ratio is 1.5-3.5:1.

4. The material according to claim 1, wherein the trivalent metal compound comprises an aluminum acid phosphate and the silicon-containing moiety comprises sodium silicate.

5. The material according to claim 2, wherein the trivalent metal compound comprises an aluminum acid phosphate and the silicon-containing moiety comprises sodium silicate.

6. The material according to claim 3, wherein the trivalent metal compound comprises an aluminum acid phosphate and the silicon-containing moiety comprises sodium silicate.

7. The material according to claim 1, wherein the trivalent metal compound is aluminum sulphate and the silicon-containing moiety comprises sodium silicate.

8. The material according to claim 2, wherein the trivalent metal compound is aluminum sulphate and the silicon-containing moiety comprises sodium silicate.

9. The material according to claim 3, wherein the trivalent metal compound is aluminum sulphate and the silicon-containing moiety comprises sodium silicate.

10. The material according to claim 1, which is obtained by heating to at least 100° C.

11. The material according to claim 4, wherein the aluminum acid phosphate is aluminum hydrogen phosphate.

12. The material according to claim 1, wherein the silicon-containing moiety comprises colloidal silica.

13. The material according to claim 1, wherein the silicon-containing moiety comprises silica having a particle size of 1 to 200 μm.

14. A coating composition comprising the anticorrosive material according to claim 1 and a paint vehicle.

15. The coating composition according to claim 14, wherein the paint vehicle is selected from the group consisting of water, alkyd resins, epoxy resins and drying oils.

16. A coating composition according to claim 14, wherein the anticorrosive material is in an amount of 1 to 20% by weight.

17. An anticorrosive material comprising a material obtained by reacting a trivalent aluminum or iron compound or a mixture thereof with a soluble silicate in an aqueous solution, separating the resultant reaction product, and heating the product to form a dried material, the atomic ratio of silicon to aluminum or iron or mixture thereof being 0.2-30:1.

18. The material according to claim 17, wherein the trivalent compound is a trivalent aluminum compound.

19. The material according to claim 17, wherein the reaction is carried out under acidic conditions.

20. A coating composition comprising the anticorrosive material according to claim 17 and a paint vehicle.

21. The coating composition according to claim 20, wherein the paint vehicle is selected from the group consisting of water, alkyd resins, epoxy resins and drying oils.

22. The coating composition according to claim 20, wherein the anticorrosive material is in an amount of 1 to 20% by weight.

* * * * *